United States Patent
Bloom

[11] Patent Number: 6,104,513
[45] Date of Patent: Aug. 15, 2000

[54] HIGH BANDWIDTH COMMUNICATION SYSTEM FOR LARGE BUILDINGS

[75] Inventor: Scott H. Bloom, Encinitas, Calif.

[73] Assignee: Air Fiber, Inc., San Diego, Calif.

[21] Appl. No.: 09/035,373

[22] Filed: Mar. 5, 1998

[51] Int. Cl.$^7$ .................................................. H04B 10/00
[52] U.S. Cl. ........................ 359/152; 359/172; 359/159; 359/145
[58] Field of Search ................................... 359/152, 145, 359/172, 159

[56] References Cited

U.S. PATENT DOCUMENTS

| Re. 35,736 | 2/1998 | Powell | 343/853 |
| 5,457,557 | 10/1995 | Zarem et al. | 359/121 |
| 5,710,652 | 1/1998 | Bloom et al. | 359/152 |

OTHER PUBLICATIONS

Kwong et al., "Coherent–detection of narrow–linewidth millimeter–wave and microwave subcarrier signals for future mobile/personal communications," Proceedings of the Military Communications Conference, Long Branch, NJ., 3:940–944 (1994).
Patent Abstracts of Japan, JP 08 331052 A (Sony Corp.) vol. 097, No. 004 (1997).

*Primary Examiner*—Leslie Pascal
*Assistant Examiner*—Hanh Phan
*Attorney, Agent, or Firm*—Fish & Richardson P.C.

[57] ABSTRACT

A system and method for large building high bandwidth communication. An interface station is located on or near the building for providing high bandwidth communication between an external communication network and at least one, but typically several or many, free space optical distribution transceivers. Each free space optical distribution transceiver provides two-way optical communication utilizing beam splitters with at least two but typically several or many free space optical user transceivers within the large building. In a preferred embodiment each of several free space laser distribution transceivers are located on the top of a ten-story building and transmits information to free space laser user transceivers located on each of the ten stories of the building. Beam splitters are mounted on the windows of each floor to direct a portion of the laser beam from the roof-mounted transceiver to the user laser transceiver located on each floor. Once the signal is inside the building it can be distributed to informational appliances within the building by conventional methods. This system can provide one-way or two-way communication. Informational appliances can originate high bandwidth signals within the building, then transmit those signals first to free space optical user transceivers also within the building, then to the optical beam splitters outside the windows, then to the free space optical distribution transceivers exterior to the building, and finally to the building interface station and from there to the external communication network.

13 Claims, 1 Drawing Sheet

HIGH BANDWIDTH COMMUNICATION SYSTEM FOR LARGE BUILDINGS

The present invention relates to communication systems and in particular to free space optical communication systems.

BACKGROUND OF THE INVENTION

Communications within large buildings is generally done with twisted telephone wire. This type of system is generally adequate for telephone and FAX communications and for most computer communications including internet communications. However, for video and other image communication systems, higher bandwidth is needed. This higher bandwidth is generally provided using coaxial cables or optical fibers. Providing large buildings, such as a multi-story building, with coaxial cables or fiber optics can be very expensive, especially for old buildings. Techniques for providing free space optical communications are known. (See "A Brief History of Free-Space Laser Communications" by David L. Begley in *Selected Papers on Free-Space Laser Communications*, David L. Begley, ed., SPIE Optical Engineering Press, 1991.)

What is needed is an inexpensive, high bandwidth communication system for large buildings.

SUMMARY OF THE INVENTION

The present invention provides a system and method for large building high bandwidth communication. An interface station is located on or near the building for providing high bandwidth communication between an external communication network and at least one, but typically several or many, free space optical distribution transceivers. Each free space optical distribution transceiver provides two-way optical communication using beam splitters with at least two but typically several or many free space optical user transceivers within the large building. In a preferred embodiment each of several free space laser distribution transceivers are located on the top of a ten-story building and transmits information to free space laser user transceivers located on each of the ten stories of the building. Beam splitters are mounted on the windows of each floor to direct a portion of the laser beam from the roof-mounted transceiver to the user laser transceiver located on each floor. Once the signal is inside the building it can be distributed to informational appliances within the building by conventional methods. This system can provide one-way or two-way communication. Informational appliances can originate high bandwidth signals within the building, then transmit those signals first to free space optical user transceivers also within the building, then to the optical beam splitters outside the windows, then to the free space optical distribution transceivers exterior to the building, and finally to the building interface station and from there to the external communication network. In other embodiments the laser beam to and from the distribution transceiver may be transmitted horizontally and reflected through windows from beam splitters. The distribution transceivers can be located along the sides of the building or on top and transmit to mirrors located along the sides of the building.

DETAILED DESCRIPTION OF THE PREFERRED EMBODIMENTS

Figure 1:
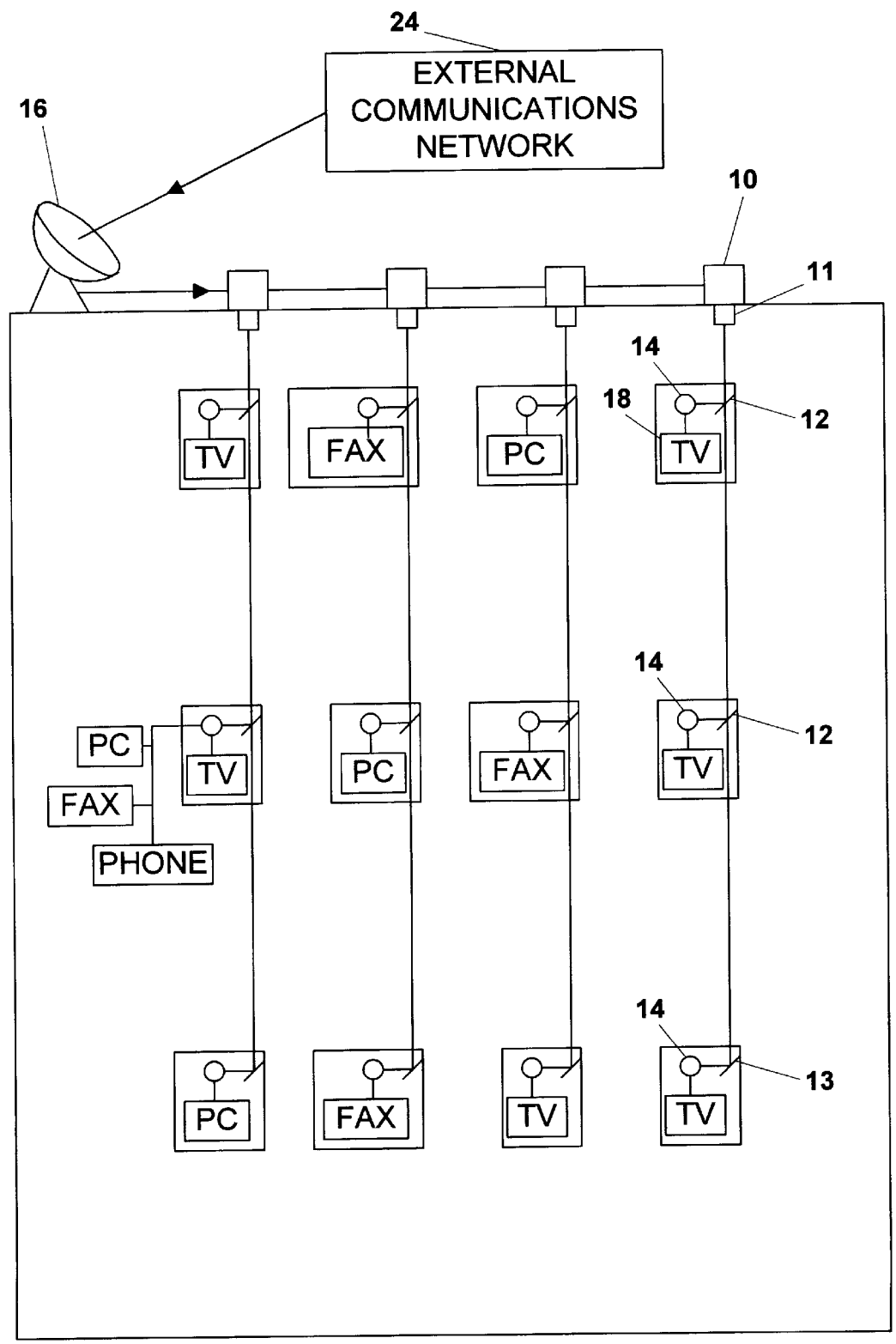
FIG. 1 shows the preferred embodiment of the present invention.

A preferred embodiment of the present invention is described by reference to the figures.

The System

FIG. 1, which shows a building with preferred embodiment of a free space optical communication system in accordance with the present invention. The interface station and four distribution laser transceivers are mounted on the roof with the distribution beams being transmitted up and down one side of the building. In this preferred embodiment, high bandwidth signals travel a path that flows from an external communication network 24 to interface station 16 (which in this case is a microwave satellite dish), through cables to laser distribution transceivers 10, to optical beam splitters 12 (and mirror 13) located outside the building windows, and finally to user laser transceiver 14 located inside the building. When the signal is received inside the building, it can be run with conventional wiring to information appliances 18 such as a television, personal computer, FAX machine or telephone. This system is fully functional as a two-way system in that information can be transmitted from user locations within the building, converted to a laser signal in user transceiver 14, which signal is reflected off beam splitter 12 (or mirror 13) back up to distribution transceiver 10. The user transmitted information is then converted into electronic signals in transceiver 10 and the electronic signals are in turn transmitted through interface station 16 back to external communication network 24. In this preferred embodiment ethernet equipment is provided for all of the transceivers so that all users can access and use the system without interference with each other.

Laser communications links are not licensed by the FCC and are capable of carrying information at the rate of 155–622 Mb/sec, sufficient for broadband distribution of DBS signals, cable television signals, HDTV signals, multimedia, and voice.

There are many thousands of existing buildings, particularly in older settled regions in the United States and other countries that are not provided with communication which can support modern telecommunications. In these situations it often very expensive to install wiring inside the building, especially if the building is a stone or concrete building. Systems according to the present invention are perfect to solve this problem. The systems can be installed typically at much lower cost than a conventional system. The user transceivers are expected to cost about $100 to $200 and the distribution transceivers should cost about twice that amount. Beam splitters can be very inexpensive and rest of the system is conventional and needed in competitive systems. Labor cost to install the present system should be very much less than the cost to install competitive systems.

Optical communications transceivers 10 that comprise the downlink function may be arrayed across the edge of the roof and pointed down so to line up with a row of windows running vertically along the building, as shown in FIG. 1.

The distribution transceivers could be mounted to transmit their communication beams horizontally, also using beam splitters to split off a portion of the horizontal beam for each user. Obviously, the communication beams between the distribution transceiver and the beam splitters are not restricted to a single straight line but can be directed in any direction with mirrors.

Optical Distribution Transceivers

In this preferred embodiment, the free space optical distribution transceivers 10 (made by AstroTerra Corporation, San Diego, Cailf. Model T-4, operating at 155 Mb/sec) are each mounted on an adjustable azimuth/ elevation gimbal. Each transceiver 10 has a CCD camera 11 mounted along its optical axes for alignment. At the lowermost window the transceiver beam is aligned using an infrared viewer (Model 155, made by Fujitsu with offices in Tokyo, Japan) with the beam splitter mounted on that window such that the transmitted beam is centered on the beam splitter. The beam of this transceiver is eye safe. The reader should note that although CCD cameras are specified for this embodiment many other well-known alignment techniques could be used instead; or a quad cell can be substituted for the CCD detector. CCD detectors are preferred because they have become very inexpensive (about $20 each) and they tend to make alignment easier reducing installation costs.

Beam Splitters

At each window in the building a beam splitter 12 is mounted on the windowpane using an adhesive of the type used for attaching rear view mirrors to the windshields of automobiles. Beam splitters 12 are mounted on flextures such that they have two degrees of freedom for adjustment of the split signal to the indoor transceiver 14. The beam splitter on the topmost window is then adjusted via its flextures so that the signal is split into the uppermost window of the building and into the laser communications transceiver mounted 14 inside the building window. The CCD camera on transceiver 14 inside is monitored while the beam splitter's flextures are being adjusted until maximum signal is obtained. This procedure is repeated for all of the beam splitters 12 and transceivers 14 along the window column, as well as the rest of the columns along the building.

Signal Analysis

Reflectivity of Beam Splitters

Preferably, the reflectivity values of the beam splitters 12 along the path are chosen such that the portion of the beam extracted into each window is relatively constant, regardless of the path and the weather. For N beam splitters 12, separated by varying distances, the reflectivity of each should preferably be calculated such that the power received by each user transceiver is equal to each other user transceiver. The transmitted power is $P_0$ and the reflectivities of the beam splitters are represented by $R_N$. The distances to each beam splitter are given by $D_N$. For a situation with no attenuation due to weather the reflectivity of the beam splitters are given by:

$$R(N) := \frac{R_1}{1 - (N-1) \cdot R_1}$$

where N is the number of the beam splitter from the transmitter source and $R_1$ is the reflectivity of the first beam splitter, a chosen parameter in this system. For the case of no attenuation between beam splitters, we have $R_1 = 0.01$. 01. Applying the above formula gives us, $R(2) = 1.01010101 \times 10^{-2}$ $R(3) = 1.02040816 \times 10^{-2}$ $R(4) = 1.03092784 \times 10^{-2}$ $R(5) = 1.04166667 \times 10^{-2}$ The received power at each splitter is then:

$$P(N) := \left\| \begin{array}{l} R_1 \text{ if } N = 1 \\ \left[ \left[ \prod_{j=1}^{N-1} (1 - R(j)) \right] \cdot R(N) \right] \end{array} \right\|$$

Worst Case Weather Conditions-Dense Fog

If weather effects are included then atmospheric attenuation along the path must be considered. Assume (very conservatively) an attenuation coefficient α of 90/km (corresponding to the worse atmospheric attenuation expected which is 40-foot visibility fog) and $D_N = (10 \text{ m}) \text{ N}$. Then:

J=1.10

$R_1 = 0.00018$

α=90

$D_j = 0.01$

Here the reflectivities are given by:

$$R(N) := \left| \begin{array}{l} R_1 \text{ if } N = 1 \\ \dfrac{R_1 \cdot \exp\left(\alpha \cdot \sum_{j=2}^{N} D_j\right)}{1 - R_1 \cdot \left(\sum_{j=1}^{N-1} \exp\left(\alpha \cdot \text{if}\left(j > 1, \sum_{q=2}^{j} D_q, 0\right)\right)\right)} \end{array} \right|$$

The received power at each splitter is then:

$$P(N) := \left\| \begin{array}{l} R_1 \cdot \exp(-\alpha \cdot D_1) \text{ if } N = 1 \\ \left[ \left[ \prod_{j=1}^{N-1} (1 - R(j)) \right] \cdot R(N) \cdot \exp\left(-\alpha \sum_{j=1}^{N} D_j\right) \right] \end{array} \right\|$$

Where α is the attenuation coefficient for the weather type encountered and $R_1$ is as above. For example, for a building that has 10 stories and therefore 10 windows, the reflectivities that equalize the power reflected into each window very dense fog situations are given in the following Table 1:

TABLE 1

| Story Number (N) | Reflectivity R (N) |
|---|---|
| 1 | $1 \cdot 10^{-4}$ |
| 2 | $2.4598491 \cdot 10^{-4}$ |
| 3 | $6.05174113 \cdot 10^{-4}$ |
| 4 | $1.48938947 \cdot 10^{-3}$ |
| 5 | $3.6687712 \cdot 10^{-3}$ |
| 6 | $9.05694894 \cdot 10^{-3}$ |
| 7 | $2.24801009 \cdot 10^{-2}$ |
| 8 | $5.65646835 \cdot 10^{-2}$ |
| 9 | $1.47465398 \cdot 10^{-1}$ |
| 10 | $4.25444728 \cdot 10^{-1}$ |

Received Power where the transmitted power is $P_0$, the power into each window P will be about $4 \times 10^{-5}$ since $e^{-(90)\,(0.01)} = 0.4$.

Bit Error Ratio

The predicted bit error rate (BER) for this system is determined by calculating the received power for each link. Since we have predetermined the beam splitter reflectivities so that the power will be constant into each window, we only need to calculate the received power at any window. From Table 1 we see that the received power is about $4 \times 10^{-5}$ times the transmitted power. For 20 mW of transmit power and a beam divergence of 500 microrads we can calculate the bit error rate for the most severe weather condition. The received power in this condition is then $80 \times 10^{-5}$ mW at each window.

$$P_{rec}(R) := P_{laser} \cdot \frac{A_{scope}}{(\theta_{div} \cdot R)^2 \cdot \frac{\pi}{4}} \cdot \eta_{scope} \cdot e^{-\alpha_{atmos} \cdot R}$$

Similarly the background power can be calculated by using the average value of the Sun's earth irradiance at the surface which is 0.2 W/m^2/nm/sr. The value of the background light is then:

$$P_B = \frac{0.2W}{m^2 \cdot nm \cdot sr} \cdot 0.008 \, m^2 \cdot 10nm \cdot (0.0005 \, rad)^2 \cdot \frac{1}{2} = 2 \times 10^{-9} W$$

For persons skilled in the art of communications systems it is then an easy matter to compute the predicted BER which in this case is less than $10^{-16}$. This calculation assumes equal probabilities of ones and zeros and an optimal threshold value is used for each received signal value. The modulation scheme is On-Off Keying (OOK) with direct detection.

Rain and Snow

This particular embodiment will perform at acceptable BER for an ATM protocol at ranges to 100 meters in all weather conditions. The maximum rain attenuation is about 20 dB/km at a rate of four inches per hour, over three orders of magnitude less attenuation than the worse case fog conditions at similar distances. Snow has an order of magnitude less attenuation than the worst case fog at 100 meters range so the BER performance in either scenario will be better than that for fog.

The laser communications transceivers are eye-safe at the aperture, falling below the 2 mW/cm^2 called for in the ANSI Z.131.1-1986.

Scintillation

Another atmospheric effect to consider is scintillation caused changes in the refractive index along the propagation path. These scintillants scale in size as the square root of the produce of wavelength and range and therefore for this embodiment are approximately 1 cm in diameter at 100 meters range. This means that the laser communications transceivers are averaging over 50 scintillants which greatly reduces (by a factor of about 50) the expected variation in signal due to scintillation.

The expected scintillation probability density is given by:

$$P(I, \sigma_\chi^2) = \frac{1}{2I\sqrt{2\pi\sigma_\chi^2}} \exp\left[\frac{(\ln I + 2\sigma_\chi^2)^2}{8\sigma_\chi^2}\right]$$

$$\approx \frac{1}{2I\sqrt{2\pi\sigma_I^2}} \exp\left[-\frac{(I - \langle I \rangle)^2}{8\sigma_I^2}\right]$$

For this path the variance is about 0.032 which means the resulting probability distribution is nearly Gaussian centered about the mean transmitted signal intensity, with a standard deviation determined by Poisson statistics (approximately the square root of the number of received photons in a pulse). Therefore the BER equations used above are valid and scintillation has a negligible effect on this embodiment.

Beam Wander

The predicted beam wander due to variations in the index of refraction along the path can be calculated from:

$$\sigma_\theta^2 = \frac{4}{100^2} \cdot \int_0^{100} C_n^2(h(z))(R-z)^2(R\theta)^{-\frac{1}{3}} dz$$

$$\sigma_\theta \approx 100 \, \mu rad$$

This works out to be about 100 microradians, a factor of 5 smaller than the transmitted beam divergence and is not a factor effecting this embodiment.

The embodiment we describe here will have the transceivers mounted on poles extending at varying from the building. The maximum deflection in a hurricane force wind of 15 lbs/in^2 can be calculated from:

$$\theta_{max} = \frac{1}{6} \cdot \frac{15 lb/in^2 \cdot 10 in \cdot L^3}{3 \times 10^7 lb/in^2 \cdot \frac{\pi}{4} \cdot (10 in)^4}$$

Where the pole diameter is 10 inches and the two materials used in this embodiment are aluminum and steel. In our embodiment no pole is longer than 5 feet. The maximum deflection in either case is not a significant fraction of our beam divergence and therefore winds will not effect the alignment of our device as described in this embodiment.

Thermal Effects

Thermal effects due to asymmetric thermal expansion of a building upon which a transceiver is mounted is given by:

$$\Delta\theta \approx 10^{-5} \cdot \frac{\Delta T}{3L}$$

For a change in temperature of 50 degrees Celsius the angular displacement of a fifteen-story building is less than 100 microradians, a negligible amount compared to the transmitted beam divergence.

User Laser Transceiver

In this preferred embodiment, signals transmitted from transceiver 10 back up to the distribution transceivers 14 follow the reverse path as the beam analyzed in detail above. Therefore, the same analysis applies to these user-originated signals. Note that most of the transmitted signal from transceivers 10 on the higher floors will pass through beam splitters 12 and be lost. This may be considered a disadvantage in some cases. However, one advantage is that all user transceivers will operate at about the same power without regard to which floor they are on. An alternative is to provide separate beam splitters for the return signal and to mount them so that the beams from the lower floors do not pass through the upper floor beam splitters.

The foregoing description of the present invention has been presented for the purpose of illustration and is not intended to limit the invention to the precise form disclosed. It is understood that many modifications and changes may be effected by those skilled in the art. For example, there could be several optical frequencies used for increased bandwidth. Repeaters could be used for very tall buildings. The beam splitters can be mounted on the windows directly as indicated above or the building itself and brought to the window with an additional mirrors. Lasers or LEDs could be used for the light source for transmitter 10. Beam splitters could be power, polarization, or color based. The beam splitters could be heated to prevent snow from sticking on them and could be treated with an appropriate coating to keep rain droplets from sticking to the surfaces of the beam splitters. Also, rain and snow problems could be virtually eliminated by transmitting the beam horizontally and providing a cover above the beam splitter.

A laser transceiver as specified previously for the rooftop could also reside inside the building window. Two-way communications are possible using either spatial separation (as in the specified transceiver) or wavelength separation. Users of the network would then use well known protocols for exchanging information up and downstream such as fast Ethernet, ATM, Internet Protocol (TCP/IP) or token ring. In this embodiment the preferred method is fast Ethernet since over 98% of installed local area networks use this protocol. Users can purchase inexpensive commercially available cards to interface computers into a fast Ethernet network, as are available from numerous vendors. Laser transmit power would automatically be equalized due to the symmetric nature of the beam splitters being used to distribute the signal. For wireless distribution into a femto cell, cards are available at 10 base T Ethernet speeds for less than $50 per card that will operate to 10 Mb/sec. Speeds are always increasing and it is evident to practitioners that higher wireless speeds will be developed.

Accordingly, it is intended by the appended claims to cover all modifications and changes that fall within the true spirit and scope of the invention.

I claim:

1. A system for communicating high bandwidth signals in-between informational appliances located within a building and an external communication network, comprising:
   A. at least one free space optical distribution transceiver located on said building,
   B. a plurality of optical beam splitters located outside the windows of said building, each beam splitter being adjusted to reflect to the inside of said building a portion of an optical communication beam from said at least one free space optical distribution transceiver,
   C. a plurality of free space optical user transceivers, wherein each such user transceiver:
      1) is located within said building and oriented so as to receive a portion of said optical communication beam reflected by one of said beam splitters and to transmit a free space optical communication signal to one of said at least one free space optical distribution transceivers, and
      2) is in communication with at least one of said informational appliances, and
   D. an interface station located on or near said building for providing high bandwidth communication between said free space optical distribution transceiver and said external communication network.

2. A system as in claim 1, wherein said interface station comprises a direct broadcast satellite receiver dish.

3. A system as in claim 1, wherein said interface station is located on the roof of said building.

4. A system as in claim 1, wherein said at least one free space optical distribution transceiver is at least four free space laser transceivers.

5. A system as in claim 4, wherein each of said at least four free space laser transceiver is mounted on an edge of a roof of said building and aligned in a downward direction such that a laser beam from each of said laser transceivers intersects a plurality of said optical beam splitters, each beam splitter causing a portion of said laser beam to be reflected through a window into said building.

6. A system as in claim 1, wherein said at least one free space distribution transceiver is a laser transceiver defining an optical axis and is each mounted on an adjustable azimuth/elevation gimbal and comprises a CCD camera mounted along said optical axes for alignment.

7. A system as in claim 1, wherein said plurality of optical beam splitters are mounted on said windows with an adhesive.

8. A system as in claim 1, wherein said beam splitters comprise coatings providing varying degrees of reflectivity so that signal power into each window is roughly equal to signal power into all other windows.

9. A method for distributing high bandwidth signals throughout a building without running wires, comprising:
   A. receiving said high bandwidth signals from an external communication network with an interface station located on said building and then re-transmitting said high bandwidth signals to a plurality of free space laser distribution transceivers,
   B. transmitting said high bandwidth signals from each of said free space laser distribution transceivers to a plurality of free space user laser transceivers by directing communication laser beams from said distribution transceivers at a plurality of beam splitters located outside windows and oriented to reflect the communication beams to said plurality of user laser transceivers, and
   C. transmitting said high bandwidth signals from each one of said plurality of user laser transceivers to at least one informational appliance within said building.

10. A method as in claim 9 and further comprising the steps of transmitting high bandwidth signals from a plurality of informational appliances within said building to said external communication network utilizing said plurality of free space user laser transceivers, said plurality of free space laser distribution transceivers and said interface station to provide two-way communication from said external communication network and said informational appliances within said building.

11. A system as in claim 10, wherein said reflectivity of each of said beam splitters takes into consideration attenuation due to weather and is given by:

$$\frac{R_1 \cdot \exp\left(\alpha \cdot \sum_{j=2}^{N} D_j\right)}{1 - R_1 \cdot \left(\sum_{j=1}^{N-1} \exp\left(\alpha \cdot \text{if}\left(j > 1, \sum_{q=2}^{j} D_q, 0\right)\right)\right)}$$

where,

N=the number of the beam splitter from the distribution transceiver;

$R_1$=the reflectivity of the first beam splitter, a chosen parameter;

=the attenuation coefficient for a severe weather type expected to be encountered.

12. A system as in claim 10, wherein said reflectivity of each of said beam splitters is approximated by:

$$R(N) := \frac{R_1}{1 - (N-1) \cdot R_1}$$

where,

N=the number of the beam splitter from the distribution transceiver;

$R_1$ is the reflectivity of the first beam splitter, a chosen parameter.

13. A system as in claim 12, wherein each of said plurality of optical beam splitters comprise flextures to give at least two degrees of freedom for adjustment.

* * * * *